C. E. WEAVER.
WINDSHIELD.
APPLICATION FILED JUNE 16, 1921.
1,435,356.
Patented Nov. 14, 1922.
2 SHEETS—SHEET 1.
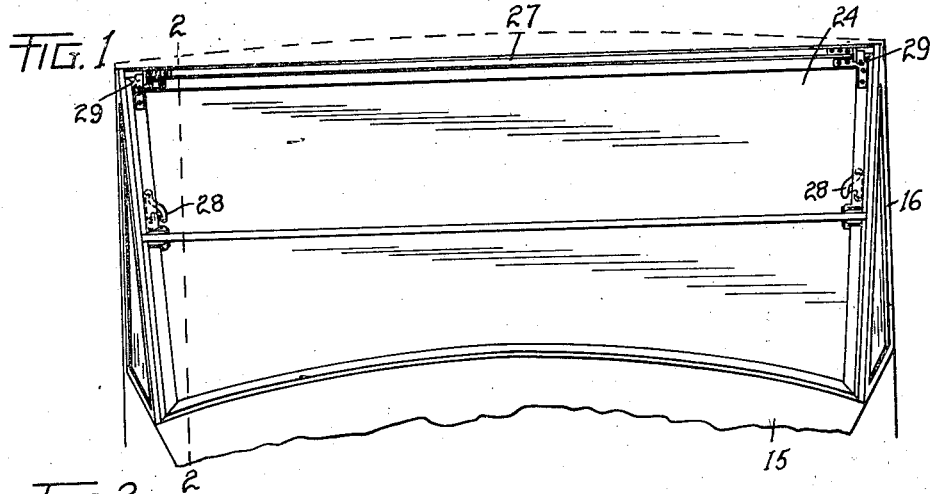
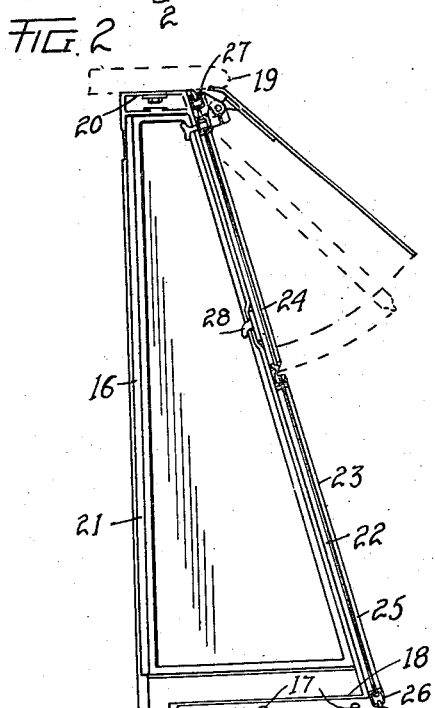
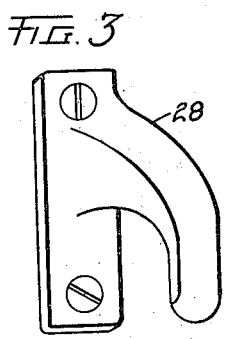
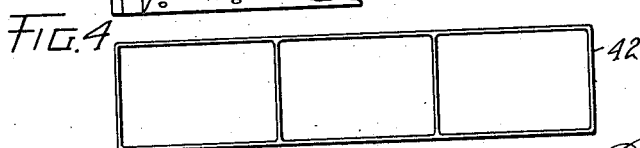
Inventor
Caius E. Weaver
By S. Arthur Baldwin
Attorney

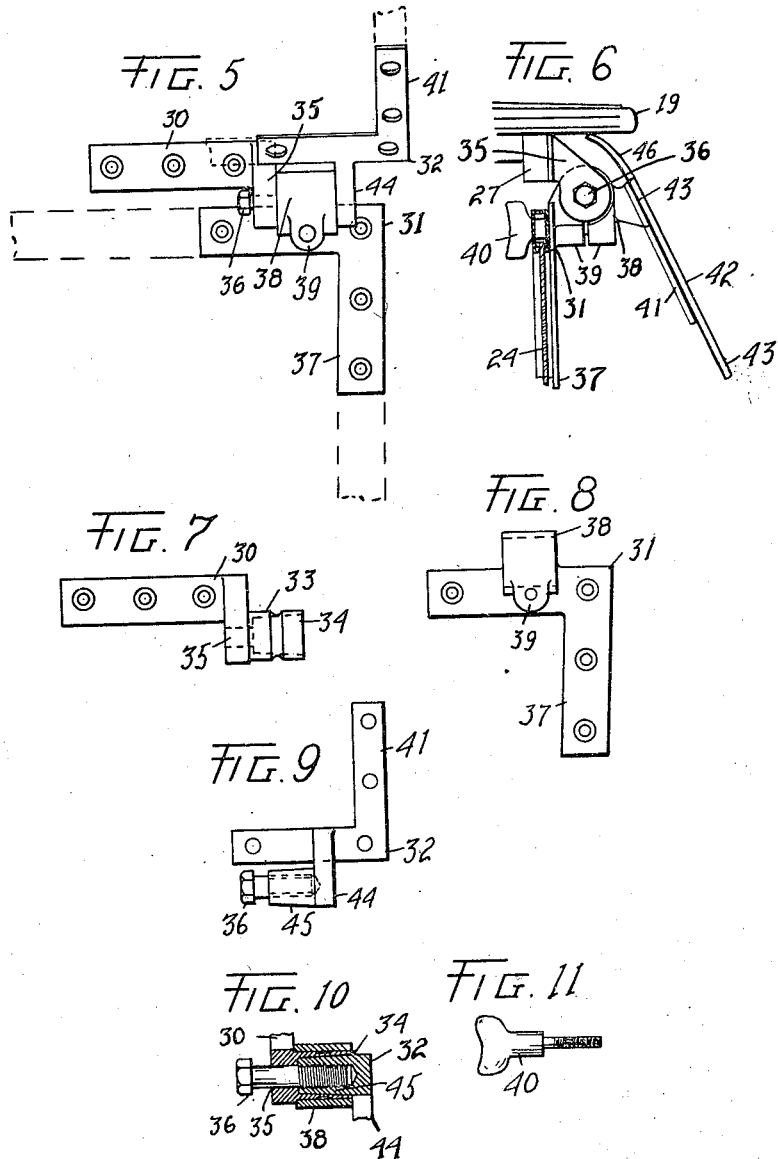

Patented Nov. 14, 1922.

1,435,356

UNITED STATES PATENT OFFICE.

CAIUS E. WEAVER, OF SYRACUSE, NEW YORK, ASSIGNOR TO BIRMINGHAM MOTORS, A TRUST, OF JAMESTOWN, NEW YORK.

WINDSHIELD.

Application filed June 16, 1921. Serial No. 477,998.

*To all whom it may concern:*

Be it known that I, CAIUS E. WEAVER, a citizen of the United States, residing at the city of Syracuse, in the county of Onondaga and State of New York, have invented certain new and useful Improvements in Windshields, of which the following, taken in connection with the accompanying drawings, is a specification.
The invention relates to wind shields for motor vehicles; and the object of the improvement is to provide a wind shield construction in which the frame supporting standards of the wind shield for each side become a part of the wind shield construction, having a strong preferably metallic frame with glass therein and means of attachment to the body of the vehicle; second, to provide the front portion of the wind shield in two parts, the upper part being hinged to the cross bar between the supporting standards by a double clamping hinge which supports said upper part at any degree of inclination and opening in relation to the under part; and third, to provide a visor frame hinged to the second clamping portion of said double hinge, which is preferably covered with opaque material, and having an upwardly extending flexible lap piece from said visor frame, said double hinge being arranged to adjust said visor and top portion of the wind shield at any desired angular relation to one another within the rotative scope of said hinge; and the invention consists in the novel features and combinations hereinafter set forth and claimed.

In the drawings, Figure 1 is a perspective view of the front of the wind shield showing the front lines of the automobile body, the top line being shown in dotted outline in order to show the cross bar which connects the supporting standards for the wind shield, the hinges for said upper portion of said wind shield and the wind shield visor being attached to said cross bar preferably near each end of the same. Fig. 2 is a sectional view at line 2—2 in Fig. 1, showing the preferred construction and arrangement of the parts, the top being shown in dotted outline, and the upper hinged portion of the wind shield being also in a downwardly extended position beneath the visor. Fig. 3 is a plan view of one of the hooked handles for the inner side of the upper portion of the wind shield showing the sidewise extension of said handle, which handle is attached upon the frame side at each end of said upper portion. Fig. 4 is an elevation of the frame for the visor. Fig. 5 is a plan view of the double clamping lock with the visor portion in the raised position and the corner of the hinged upper portion of the wind shield in dotted outline as when said hinge is attached thereto. Fig. 6 is an enlarged sectional view at line 2—2 in Fig. 1 with the exception of the top, showing an end elevation of said hinge and the preferred construction and arrangement of the parts around the same. Figs. 7, 8 and 9 show elevations of the three parts of said clamping hinge separated from one another to show the preferred construction of the same. Fig. 10 is a lengthwise sectional view of the double clamping joint for the upper portion of the wind shield and for the visor with all the parts in the assembled position, the outer portions being broken away. Fig. 11 is an elevation of the preferred form of clamping screw.

Like characters of reference refer to corresponding parts in the several views.

The numeral 15 designates the hood or engine housing of an automobile which has the standards 16 attached thereto through the holes 17 in the flange 18 in the lower ends of said standards 16, and the top 19 thereto through the top flange 20 on the inner side of said standards 16 as shown in Fig. 2.

The standards 16 are preferably made of light metal in the upwardly tapering form so as to provide a vertical rear edge 21 for the door of the sedan or limousine type of automobile body, and to provide the forwardly inclined front edges 22 upon which are supported the lower portion 23 and the upper portion 24 of the wind shield. The lower portion 23 of the wind shield is made of glass and preferably attached around the edges of the frame of the same to the body 15 and standards 16 along the lower edge and ends, the glass portion 25 being supported in the frame portion 26, and provided with suitable weather stripping to tighten all the joints.

The upper wind shield portion 24 is hinged to a cross bar 27, which bar is firmly attached to the standards 16 at each end of the same to which also the top 19 may be attached to strengthen and stiffen the construction. Said cross bar 27 is preferably tubular and formed from sheet metal and provided with suitable weather stripping to tighten all joints. The shield portion 24 has the handles 28 which are preferably in the downwardly sidewise projecting hooked form and turned toward one another on the opposite sides so that they may be quickly and easily grasped by the occupant of the car to control said hinged shield portion 24.

The hinges 29 for the hinged portion 24 consist of the three parts 30, 31 and 32. The part 30 is attached to the cross bar 27 and has the hinge pin 33 supported at a suitable distance outward and downward from said cross bar 27. Said hinge pin 33 is tubular in tapered or conical form for a portion of its length, as shown at 34 in Fig. 10, and in dotted outline in Fig. 7. A hole 35 extends from said tapered opening 34 to receive therethrough the screw bolt 36.

The part 31 has the extensions 37 for attachment to the frame of said upper portion 24, being preferably in the angular form for attachment near the corner of said frame and has the projecting knuckle portion 38 which is in the form of a split spring band having the lugs 39 thereon each side of the split and the thumb screw 40 through the lugs 39 for clamping said split spring band 38 around the pin or pintle 33 to hold said upper portion 24 at any desired degree of inclination, or to entirely release the clamping hold of said band 38 upon the pintle 33.

The third portion 32 is provided with the angular extension portions 41 for attachment to the frame 43 of the visor 42. The portion 32 has the angular inward and upward extension 44 with the conical clamping pintle 45 extending at right angles to said angular extension 44 in line with the conical opening 34 in the pintle 33 to fit within the same, said pintle 45 having a threaded hole in the end thereof to receive the screw bolt 36 so as to clampingly hold said conical pintle 45 within the conical opening 44 at different positions, it only being necessary to draw the screw bolt 36 fairly tight upon said conical pintle portion 45 to permit the raising or lowering of said visor 42 when said visor will stand firmly at the adjusted position.

It is apparent that the screw 40 with the clamping band 38 around the pintle 33 and the screw 36 drawing the conical clamping joint between the pintle 45 and the walls of the conical opening 34 forms a simple two-way clamping hinge of great simplicity of construction and strength, which permits the visor 42 and hinge portion 24 to be adjusted in relation to one another as desired within the scope of the rotative movement of said parts within the limitations of their position.

The visor 42 is preferably covered with opaque material to form a shade or visor for the driver and occupants of the car, said material being extended in an upward lap portion 46 which presses against the under side of the top 19, thereby closing or opening between the upper edge of the visor frame 43 and said top 19.

What is claimed as new is:

1. In an automobile windshield, an upper member, a visor therefor, a supporting member secured to the automobile top and having a hollow tapered pintle, a member connected to the visor and having a tapered part extending into the hollow pintle, said part having an interiorly threaded bore, a screw in said bore to lock the tapered part to the pintle, and a member attached to said upper member and having a clamp engaged about the pintle and provided with a screw to adjustably secure the clamp to the pintle.

2. In an automobile windshield, an upper member, a visor therefor, a supporting member secured to the automobile top and having a hollow pintle rigidly affixed thereto, a member connected to the visor and having a part rotatable in the hollow pintle, means to hold said part against rotation, and a member connected to the upper member and having a clamp adjustably secured around the exterior of the pintle.

3. In an automobile windshield, an upper shield member, a visor therefor, a member secured to the top of the automobile, and having a hollow pin, a member secured to the upper shield member and having a part adjustably secured over the pin, a member secured to the visor and having a pintle secured in the hollow pin, and means to adjustably secure the pintle to the pin so as to adjust the visor without disturbing the adjustment of the upper member.

4. In an automobile windshield, an upper member, a visor, a bracket secured to the automobile top and having a depending part formed with a lateral hollow pin, a bracket secured to the visor and having a lateral extension provided with a pin received in the hollow pin, a bracket secured to the upper shield member and having a part adjustably clamped over the hollow pin and arranged between the depending part of the top bracket and the lateral extension of the visor bracket, and a screw for clamping the pins together in adjusted positions.

In testimony whereof I have affixed my signature in the presence of two witnesses.

CAIUS E. WEAVER.

Witnesses:
Theo. Thomas Haag,
Corinne V. Swanson.